(12) United States Patent
Amano

(10) Patent No.: US 7,688,606 B2
(45) Date of Patent: Mar. 30, 2010

(54) POWER SUPPLY CONTROL DEVICE AND PRECHARGE PROCESSING METHOD

(75) Inventor: Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 586 days.

(21) Appl. No.: 11/598,051

(22) Filed: Nov. 13, 2006

(65) Prior Publication Data

US 2007/0108959 A1 May 17, 2007

(30) Foreign Application Priority Data

Nov. 15, 2005 (JP) ............................. 2005-330168

(51) Int. Cl.
*H02M 1/00* (2007.01)
(52) U.S. Cl. ....................................................... 363/49
(58) Field of Classification Search ................ 323/908, 323/222; 363/49, 53, 15, 34, 37, 50, 59
See application file for complete search history.

(56) References Cited

U.S. PATENT DOCUMENTS 5,715,154 A * 2/1998 Rault ........................... 363/89
6,157,097 A * 12/2000 Hirose et al. ................. 307/125
2002/0191426 A1* 12/2002 Hussein et al. ................ 363/50

FOREIGN PATENT DOCUMENTS

| JP | A 5-111240 | 4/1993 |
| JP | A 5-344605 | 12/1993 |
| JP | A 7-175533 | 7/1995 |
| JP | A 9-275679 | 10/1997 |
| JP | A 10-164709 | 6/1998 |
| JP | A 2003-92807 | 3/2003 |

* cited by examiner

*Primary Examiner*—Bao Q Vu
*Assistant Examiner*—Nguyen Tran
(74) *Attorney, Agent, or Firm*—Oliff & Berridge PLC

(57) ABSTRACT

Upon receiving a start instruction, a control device turns on first and third system main relays, and performs precharge processing for charging a capacitor. Here, a limiting resistor for preventing an inrush current into the capacitor in a discharged state at the time of start is not provided in a load drive device. The control device controls a gate voltage of a power MOSFET of the third system main relay such that the power MOSFET operates in a saturation region, in a range not exceeding a maximum rated power.

6 Claims, 9 Drawing Sheets

POWER SUPPLY CONTROL DEVICE AND PRECHARGE PROCESSING METHOD

This nonprovisional application is based on Japanese Patent Application No. 2005-330168 filed with the Japan Patent Office on Nov. 15, 2005, the entire contents of which are hereby incorporated by reference.

FIELD OF THE INVENTION

The present invention relates to a power supply control device and a precharge processing method, and more particularly to a power supply control device and a precharge processing method for performing precharge processing for preventing generation of an inrush current when power supply from a DC power supply to a load device is started.

DESCRIPTION OF THE BACKGROUND ART

FIG. 12 is an overall block diagram of a load drive device including a conventional power supply control device. Referring to FIG. 12, a load drive device 200 includes a DC power supply 210, system main relays 220 to 240, a limiting resistor 250 connected in series to system main relay 240, an inverter 260 receiving supply of electric power from DC power supply 210 and driving a motor-generator 270, a capacitor 280 smoothing an input voltage of the inverter, and a control device 290.

System main relay 240 includes a power transistor and a diode connected thereto in an anti-parallel manner. System main relay 240 and limiting resistor 250 connected in series are connected in parallel to system main relay 230.

Here, DC power supply 210, system main relays 220 to 240, limiting resistor 250, and control device 290 form the power supply control device in load drive device 200, and inverter 260, motor-generator 270 and capacitor 280 form the load device receiving supply of electric power from the power supply control device in load drive device 200.

When a start instruction of load drive device 200 is given to control device 290, control device 290 initially turns on system main relay 220 and the power transistor of system main relay 240. Then, a circuit from a positive electrode to a negative electrode of DC power supply 210 through system main relay 220, capacitor 280, system main relay 240, and limiting resistor 250 is formed, and charging from DC power supply 210 to capacitor 280 is started.

Here, as limiting resistor 250 is provided in load drive device 200, an inrush current from DC power supply 210 to capacitor 280 is prevented, and welding of system main relays 220, 230 can be prevented.

As charging of capacitor 280 proceeds, control device 290 turns on system main relay 230, and thereafter turns off the power transistor of system main relay 240.

Thus, in the power supply control device above, generation of the inrush current is prevented by providing limiting resistor 250, however, limiting resistor 250 that is used only at the time of start of the system has been one of factors to increase the cost.

Japanese Patent Laying-Open No. 5-111240 proposes a power supply control device capable of preventing an inrush current without providing a limiting resistor. Japanese Patent Laying-Open No. 5-111240 discloses a technique to prevent the inrush current while suppressing an effective value of a flow-in current into a DC-DC converter by causing a transistor provided between a main battery and the DC-DC converter to perform PWM (Pulse Width Modulation) operation.

Meanwhile, Japanese Patent Laying-Open No. 2003-92807 discloses a technique to charge a capacitor with a constant current using a precharge circuit provided between a battery for driving and an inverter and to protect a transistor within the precharge circuit by reducing the constant current when a temperature of the transistor within the precharge circuit attains a temperature equal to or higher than a certain level.

The technique disclosed in Japanese Patent Laying-Open No. 5-111240, however, remains as the technique simply to cause the transistor to perform PWM operation in order to prevent the inrush current, and maximum rating, a temperature of the transistor and the like are not considered.

In addition, the precharge circuit disclosed in Japanese Patent Laying-Open No. 2003-92807 has a complicated circuit configuration, and reduction in cost is not sufficient.

SUMMARY OF THE INVENTION

The present invention was made to solve the above-described problems. An object of the present invention is to provide a power supply control device and a precharge processing method with low cost, without including a limiting resistor for preventing an inrush current.

Another object of the present invention is to provide a power supply control device and a precharge processing method preventing overheat of a system main relay, without including a limiting resistor for preventing an inrush current.

According to the present invention, a power supply control device includes: a DC power supply; a relay provided between one electrode of the DC power supply and a load device; a semiconductor switching element connected in parallel to the relay; and a control unit performing precharge processing for supplying electric charges from the DC power supply to the load device through the semiconductor switching element before turn-on of the relay. The control unit controls a control voltage of the semiconductor switching element during the precharge processing such that power loss of the semiconductor switching element does not exceed maximum rated power of the semiconductor switching element.

In the power supply control device of the present invention, the precharge processing is performed in order to prevent the inrush current from the DC power supply to the load device. The control unit controls the control voltage of the semiconductor switching element during the precharge processing such that the power loss of the semiconductor switching element does not exceed the maximum rated power of the semiconductor switching element. Therefore, generation of the inrush current is prevented without providing the limiting resistor for preventing the inrush current and without adding other circuits.

Therefore, according to the present invention, the power supply control device with low cost, without including a limiting resistor for preventing the inrush current can be achieved. In addition, the power supply control device capable of preventing overheat of the semiconductor switching element, without including a limiting resistor can be achieved.

Preferably, the semiconductor switching element is implemented by a field-effect transistor. The control unit controls a gate voltage of the field-effect transistor such that the field-effect transistor operates in a saturation region.

In the power supply control device, the gate voltage of the field-effect transistor is controlled such that the field-effect transistor operates in the saturation region. Therefore, the field-effect transistor of a small capacity can be selected. Thus, according to the present invention, the cost can further be reduced.

In addition, preferably, the semiconductor switching element is implemented by a bipolar transistor. The control unit controls a base voltage of the bipolar transistor such that the bipolar transistor operates in an active region.

In the power supply control device, the base voltage of the bipolar transistor is controlled such that the bipolar transistor operates in the active region. Therefore, the bipolar transistor of a small capacity can be selected. Thus, according to the present invention, the cost can further be reduced.

In addition, according to the present invention, a power supply control device includes: a DC power supply; a relay provided between one electrode of the DC power supply and a load device; a semiconductor switching element connected in parallel to the relay; a control unit performing precharge processing for supplying electric charges from the DC power supply to the load device through the semiconductor switching element before turn-on of the relay; and a temperature detection unit detecting a temperature of the semiconductor switching element. The control unit controls a control voltage of the semiconductor switching element during the precharge processing such that an amount of current flow in the semiconductor switching element is decreased with the increase in the temperature of the semiconductor switching element.

In the power supply control device according to the present invention, during the precharge processing, when the temperature of the semiconductor switching element is raised, an amount of current that flows in the semiconductor switching element is decreased. Therefore, according to the present invention, the power supply control device capable of reliably preventing overheat of the semiconductor switching element without including the limiting resistor for preventing the inrush current can be achieved.

In addition, according to the present invention, a power supply control device includes: a DC power supply; a relay provided between one electrode of the DC power supply and a load device; a semiconductor switching element connected in parallel to the relay; a control unit performing precharge processing for supplying charges from the DC power supply to the load device through the semiconductor switching element before turn-on of the relay; and a temperature detection unit detecting a temperature of the semiconductor switching element. The control unit subjects the semiconductor switching element to switching control during the precharge processing when the temperature of the semiconductor switching element is raised.

In the power supply control device according to the present invention, during the precharge processing, when the temperature of the semiconductor switching element is raised, the control unit subjects the semiconductor switching element to switching control. Accordingly, an average amount of current that flows in the semiconductor switching element is decreased. Therefore, according to the present invention, the power supply control device capable of reliably preventing overheat of the semiconductor switching element without including the limiting resistor for preventing the inrush current can be achieved.

Preferably, the control unit lowers on-duty of the semiconductor switching element during the precharge processing with the increase in the temperature of the semiconductor switching element.

In the power supply control device, during the precharge processing, the average amount of current that flows in the semiconductor switching element is decreased with the increase in the temperature of the semiconductor switching element. Therefore, according to the present invention, overheat of the semiconductor switching element can reliably be prevented, while appropriately suppressing an amount of current flow in the semiconductor switching element.

In addition, according to the present invention, a precharge processing method relates to precharge processing for performing precharge from a power supply device to a load device. The power supply device includes a DC power supply, a relay provided between one electrode of the DC power supply and the load device, and a semiconductor switching element connected in parallel to the relay. The precharge processing method includes the first to fourth steps. In the first step, a control voltage of the semiconductor switching element is calculated such that power loss of the semiconductor switching element does not exceed maximum rated power of the semiconductor switching element. In the second step, the calculated control voltage is output to a control electrode of the semiconductor switching element. In the third step, whether precharge performed through the semiconductor switching element is completed or not is determined. In the fourth step, if it is determined that precharge is completed, the relay is turned on.

In addition, according to the present invention, a precharge processing method relates to precharge processing for performing precharge from a power supply device to a load device. The power supply device includes a DC power supply, a relay provided between one electrode of the DC power supply and the load device, a semiconductor switching element connected in parallel to the relay, and a temperature detection unit detecting a temperature of the semiconductor switching element. The precharge processing method includes the first to fifth steps. In the first step, a detected temperature is obtained from the temperature detection unit. In the second step, a control voltage of the semiconductor switching element is calculated such that an amount of current flow in the semiconductor switching element is decreased with the increase in the obtained detected temperature. In the third step, the calculated control voltage is output to a control electrode of the semiconductor switching element. In the fourth step, whether precharge performed through the semiconductor switching element is completed or not is determined. In the fifth step, if it is determined that precharge is completed, the relay is turned on.

In addition, according to the present invention, a precharge processing method relates to precharge processing for performing precharge from a power supply device to a load device. The power supply device includes a DC power supply, a relay provided between one electrode of the DC power supply and the load device, a semiconductor switching element connected in parallel to the relay, and a temperature detection unit detecting a temperature of the semiconductor switching element. The precharge processing method includes the first to fourth steps. In the first step, a detected temperature is obtained from the temperature detection unit. In the second step, when the obtained detected temperature is raised, the semiconductor switching element is subjected to switching control. In the third step, whether precharge performed through the semiconductor switching element is completed or not is determined. In the fourth step, if it is determined that precharge is completed, the relay is turned on.

As described above, according to the present invention, the power supply control device with low cost, without including a limiting resistor for preventing the inrush current can be achieved. In addition, the power supply control device capable of preventing overheat of a system main relay, without including a limiting resistor for preventing the inrush current can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
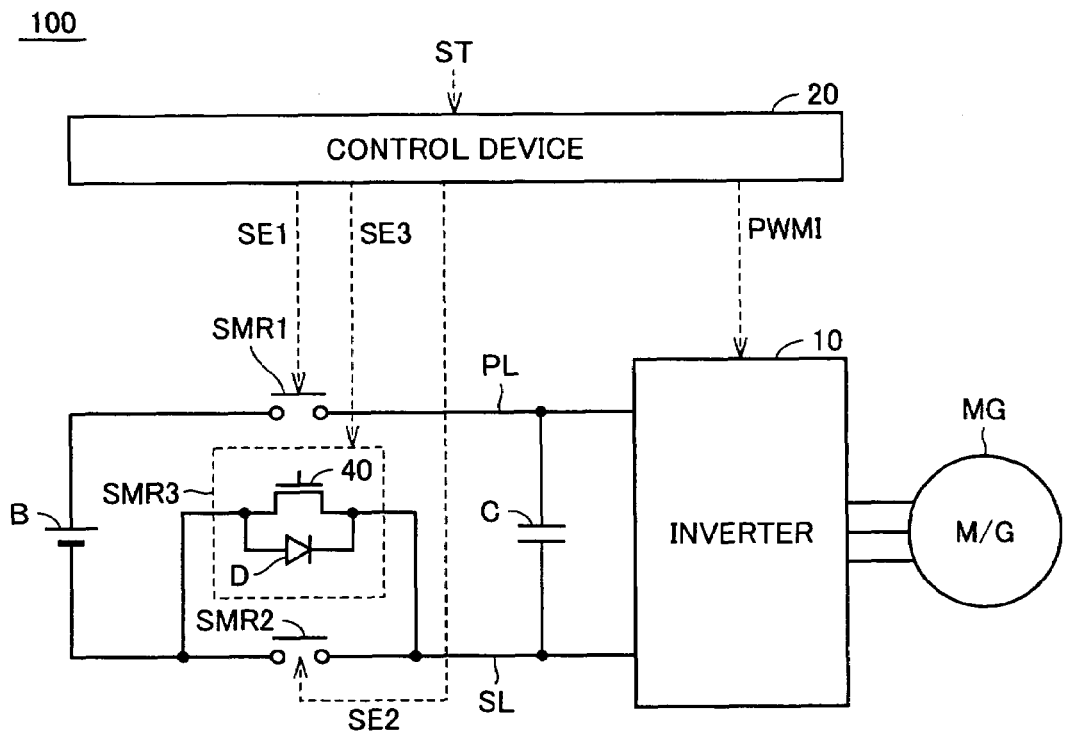
FIG. 1 is an overall block diagram of a load drive device including a power supply control device according to the first embodiment of the present invention.

An embodiment of the present invention will be described hereinafter in detail with reference to the drawings. The same or corresponding elements in the drawings have the same reference characters allotted, and therefore detailed description thereof will not be repeated.

First Embodiment

FIG. 1 is an overall block diagram of a load drive device including a power supply control device according to the first embodiment of the present invention. Referring to FIG. 1, a load drive device 100 includes a DC power supply B, system main relays SMR1 to SMR3, a capacitor C, an inverter 10, a control device 20, a power supply line PL, and a ground line SL.

System main relay SMR1 is connected between a positive electrode of DC power supply B and power supply line PL. System main relay SMR2 is connected between a negative electrode of DC power supply B and ground line SL. System main relay SMR3 includes a power MOSFET (metal oxide semiconductor field-effect transistor) 40 and a diode D connected in parallel to power MOSFET 40. System main relay SMR3 is connected in parallel to system main relay SMR2, between the negative electrode of DC power supply B and ground line SL.

Capacitor C is connected between power supply line PL and ground line SL. Inverter 10 includes a U-phase arm, a V-phase arm and a W-phase arm (not shown) connected in parallel between power supply line PL and ground line SL. Connection points between upper arms and lower arms of U-, V- and W-phase arms are connected to U-, V- and W-phase coils (not shown) of a motor-generator MG driven by load drive device 100, respectively.

DC power supply B, system main relays SMR1 to SMR3 and control device 20 form the power supply control device in load drive device 100, and inverter 10, motor-generator MG and capacitor C form the load device that receives supply of power from the power supply control device in load drive device 100.

DC power supply B is implemented, for example, by a secondary battery such as a nickel metal hydride battery or a lithium-ion battery, and supplies DC power to power supply line PL through the system main relay. It is noted that DC power supply B may be implemented by a capacitor of a large capacity or a fuel cell.

System main relays SMR1, SMR2 are implemented by a mechanical relay or a semiconductor relay. On the other hand, system main relay SMR3 is implemented by the semiconductor relay (power MOSFET 40) as described above. System main relays SMR1 to SMR3 are controlled by signals SE1 to SE3 from control device 20 respectively. Specifically, system main relays SMR1, SMR2 are turned on by signals SE1, SE2 at H (logic high) level respectively, and turned off by signals SE1, SE2 at L (logic low) level respectively. In addition, power MOSFET 40 of system main relay SMR3 receives signal SE3 at the gate terminal, and varies the drain current in accordance with the voltage level of signal SE3.

Capacitor C smoothes voltage fluctuation between power supply line PL and ground line SL. Inverter 10 converts a DC voltage received from power supply line PL to an AC voltage based on a signal PWMI from control device 20, and outputs the resultant voltage to motor-generator MG.

Upon receiving a start signal ST instructing start of load drive device 100, control device 20 performs the precharge processing for charging capacitor C in the discharged state. Specifically, upon receiving start signal ST, control device 20 initially turns on system main relays SMR1, SMR3, and as charging of capacitor C proceeds, control device 20 turns on system main relay SMR2.

Here, a limiting resistor for preventing an inrush current into capacitor C in the discharged state at the time of start of the system is not provided in load drive device 100. In order to prevent the inrush current, control device 20 controls a gate voltage of power MOSFET 40 of system main relay SMR3 such that power MOSFET 40 operates in a saturation region, in a range not exceeding the maximum rated power.

In addition, when the precharge processing ends, control device 20 starts control for driving motor-generator MG. Specifically, control device 20 generates signal PWMI for driving motor-generator MG based on a torque instruction, a motor current of each phase and an inverter input voltage of motor-generator MG, and outputs generated signal PWMI to inverter 10. The motor current of each phase and the inverter input voltage of motor-generator MG are detected by a current sensor and a voltage sensor respectively, -both of which are not-shown.

Figure 2:
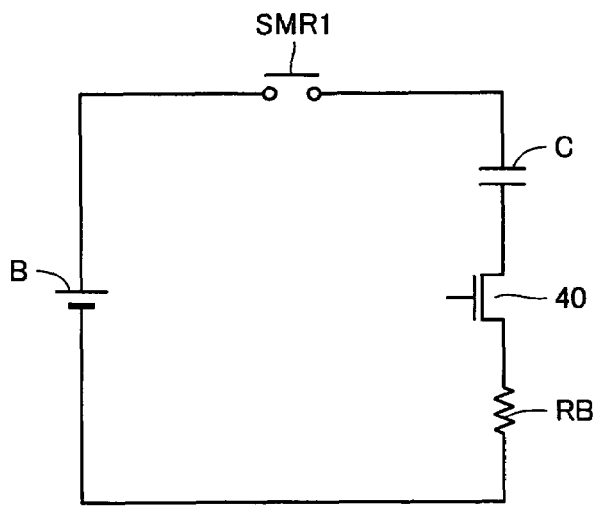
FIG. 2 is an equivalent circuit diagram of the power supply control device during precharge processing.

FIG. 2 is an equivalent circuit diagram of the power supply control device during the precharge processing. Referring to FIG. 2, during the precharge processing, a closed circuit as shown is formed. Here, a resistor RB shows the internal resistance of DC power supply B.

Assuming that a voltage across terminals of DC power supply B is denoted as E, a value of the internal resistance is denoted as r, a drain voltage of power MOSFET 40 is denoted as VDS, and a drain current is denoted as ID, drain current ID of power MOSFET 40 at the time of start of the precharge processing (that is, the voltage across terminals of capacitor C being set to 0V) is expressed as in Equation (1) below.

$$\text{Drain current } ID = (E - VDS)/r \quad (1)$$

Figure 3:
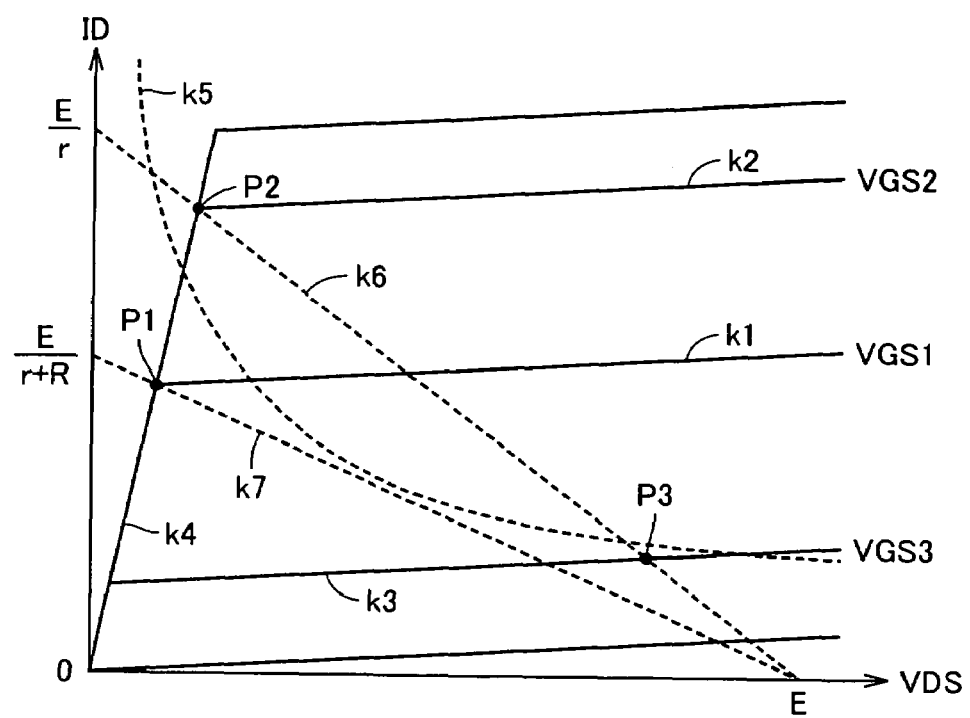
FIG. 3 is a characteristic diagram of a power MOSFET shown in FIG. 1.

FIG. 3 is a characteristic diagram of power MOSFET 40 shown in FIG. 1. Referring to FIG. 3, the abscissa represents drain voltage VDS of power MOSFET 40, and the ordinate represents drain current ID. Regions shown with solid lines k1, k2 and k3, that is, regions where drain current ID hardly depends on drain voltage VDS and exhibits the constant current characteristic determined only by gate voltage VGS, are generally referred to as a "saturation region", and a region shown with a solid line k4, that is, the region where drain current ID significantly increases with drain voltage VDS, is generally referred to as a "non-saturation region".

A dotted line k5 shows the maximum rated power of power MOSFET 40. A dotted line k6 shows relation between drain voltage VDS and drain current ID at the time of start of the precharge processing, and corresponds to Equation (1) above. A dotted line k7 shows, as comparison, relation between drain voltage VDS and drain current ID when a limiting resistor (resistance value R) for inrush current prevention is connected in series to the power MOSFET.

In the conventional power supply control device including the limiting resistor, resistance value R of the limiting resistor is determined such that dotted line k7 is lower than dotted line k5 showing the maximum rated power of the power MOSFET. Then, gate voltage VGS of the power MOSFET is set to VGS1 such that drain current ID at the time of start of the precharge processing is set to a value corresponding to a point P1 (maximum value).

In contrast, in the case of the power supply control device in the first embodiment without including the limiting resistor, if gate voltage VGS of the power MOSFET is set to VGS2 such that drain current ID at the time of start of the precharge processing is set to a value corresponding to a point P2 (maximum value), power loss of power MOSFET 40 exceeds the maximum rated power of power MOSFET 40 shown with dotted line k5, and power MOSFET 40 may break.

Then, in the first embodiment, gate voltage VGS of power MOSFET 40 is set to VGS3 such that drain current ID at the time of start of the precharge processing is set to a value corresponding to a point P3. Thus, power loss of power MOSFET 40 during the precharge processing can be suppressed to a value not higher than the maximum rated power shown with dotted line k5, and power MOSFET 40 can be prevented from breaking.

In addition, by setting gate voltage VGS of power MOSFET 40 to VGS3, power MOSFET 40 operates in the saturation region. Therefore, in the first embodiment, the power MOSFET of a capacity smaller than in the conventional power supply control device where the power MOSFET operates in the non-saturation region (on solid line k4) can be selected, and a smaller size and lower cost of the device can be achieved.

Figure 4:
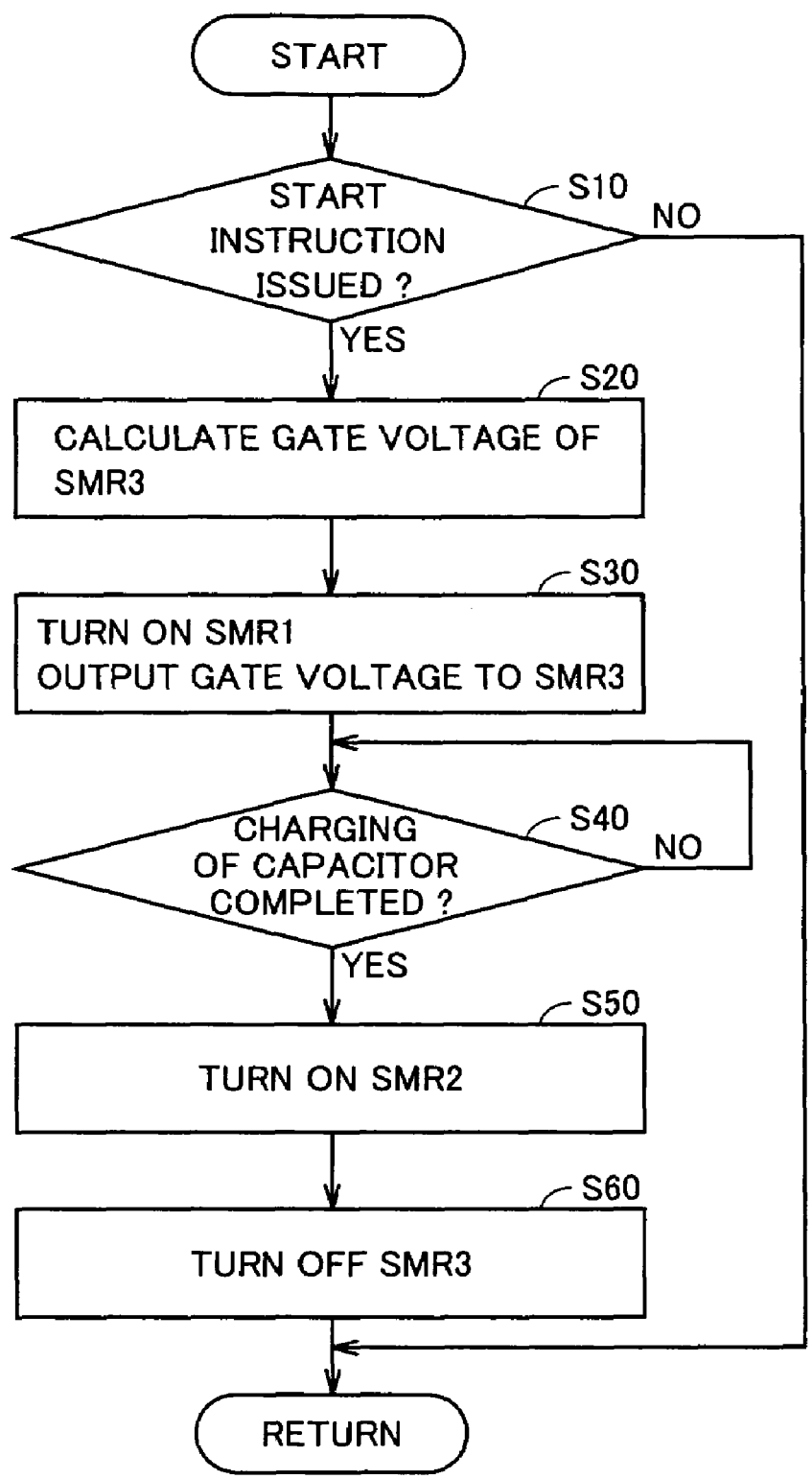
FIG. 4 is a flowchart of the precharge processing performed by the control device shown in FIG. 1.

FIG. 4 is a flowchart of the precharge processing performed by control device 20 shown in FIG. 1. Referring to FIG. 4, control device 20 determines whether an instruction to start load drive device 100 has been issued or not based on start signal ST (step S10). If control device 20 determines that the start instruction has not been issued (NO in step S10), control device 20 ends a series of processing.

If it is determined in step S10 that the instruction to start load drive device 100 has been issued (YES in step S10), control device 20 calculates the gate voltage of power MOSFET 40 of system main relay SMR3 (step S20). Specifically, control device 20 uses, for example, the characteristic diagram of FIG. 3 to calculate gate voltage VGS3 corresponding to point P3 at which Equation (1) above is satisfied and the maximum rated power of power MOSFET 40 is not exceeded.

Thereafter, control device 20 outputs the calculated gate voltage to the gate terminal of power MOSFET 40 of system main relay SMR3, and turns on system main relay SMR1 (step S30). Then, charging from DC power supply B to capacitor C is started through system main relay SMR1 and power MOSFET 40 of system main relay SMR3.

When charging of capacitor C is completed (YES in step S40), control device 20 turns on system main relay SMR2 (step S50). Thereafter, control device 20 sets the gate voltage that has been output to power MOSFET 40 to 0, turns off system main relay SMR3 (step S60), and ends a series of precharge processing.

In the description above, during the precharge processing, the gate voltage of power MOSFET 40 of system main relay SMR3 is fixed to gate voltage VGS3 calculated in step S20.

On the other hand, if it is determined in step S40 that charging of capacitor C is not completed (NO in step S40), control device 20 may return again to step S20, and the gate voltage of power MOSFET 40 may successively be operated.

An effect of successive operation of the gate voltage of power MOSFET 40 is as follows. Referring again to FIG. 3, as charging of capacitor C proceeds, relation between drain voltage VDS and drain current ID makes transition in a direction of lower drain voltage VDS from point P3 along solid line k3. Therefore, margin for the maximum rated power shown with dotted line k5 becomes greater. Then, by successively operating the gate voltage of power MOSFET 40, relation between drain voltage VDS and drain current ID can make transition along the maximum rated power shown with dotted line k5 (successively calculated gate voltage VGS gradually increases). Accordingly, drain current ID of power MOSFET 40 can be maximized in a range not exceeding the maximum rated power, and the time for precharge processing can be shortened.

As described above, according to the first embodiment, as the limiting resistor for preventing the inrush current can be dispensed with, the power supply control device with low cost can be achieved. In addition, as the gate voltage of power MOSFET 40 is controlled such that power loss of power MOSFET 40 of system main relay SMR3 does not exceed the maximum rated power, overheat of power MOSFET 40 can be prevented.

Moreover, as power MOSFET 40 operates in the saturation region, power MOSFET 40 of a smaller capacity can be selected, and consequently a smaller size and lower cost of the power supply control device can be achieved.

Variation of the First Embodiment

Figure 5:
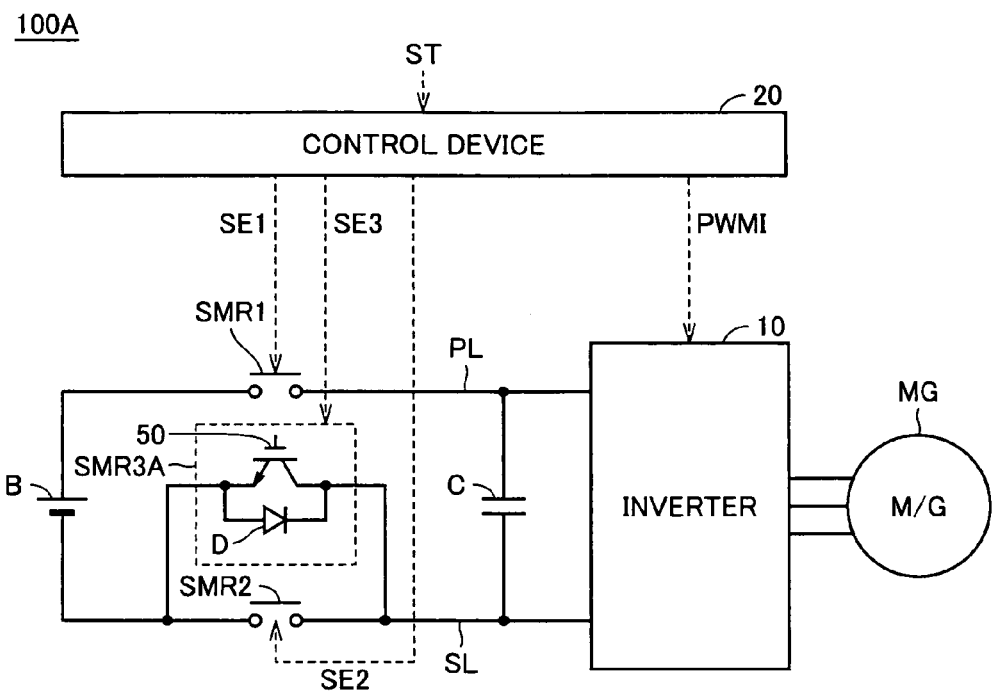
FIG. 5 is an overall block diagram of a load drive device including a power supply control device according to a variation of the first embodiment of the present invention.

FIG. 5 is an overall block diagram of a load drive device including a power supply control device according to a variation of the first embodiment of the present invention. Referring to FIG. 5, a load drive device 100A includes a system main relay SMR3A instead of system main relay SMR3 in the configuration of load drive device 100 shown in FIG. 1. System main relay SMR3A includes a bipolar transistor 50 instead of power MOSFET 40 in the configuration of system main relay SMR3 shown in FIG. 1. Bipolar transistor 50 is implemented, for example, by an IGBT (Insulated Gate Bipolar Transistor).

Figure 6:
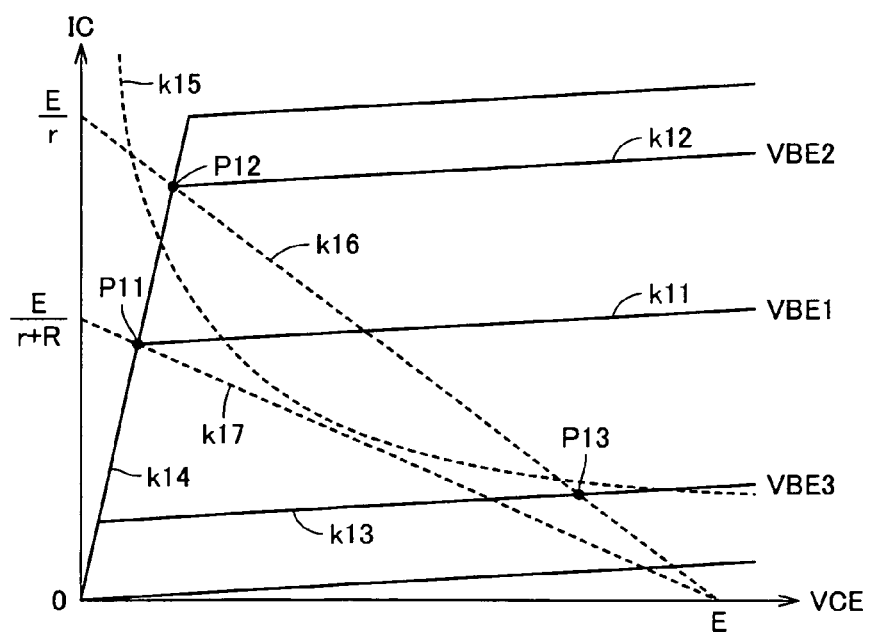
FIG. 6 is a characteristic diagram of a bipolar transistor shown in FIG. 5.

FIG. 6 is a characteristic diagram of bipolar transistor 50 shown in FIG. 5. Referring to FIG. 6, the abscissa represents a collector voltage VCE of bipolar transistor 50, and the ordinate represents a collector current IC. Regions shown with solid lines k11, k12 and k13, that is, regions where collector current IC hardly depends on collector voltage VCE and exhibits the constant current characteristic determined only by a base voltage VBE, are generally referred to as an "active region", and a region shown with a solid line k14, that is, the region where collector current IC significantly increases with collector voltage VCE, is generally referred to as a "linear region" (or "saturation region").

A dotted line k15 shows the maximum rated power of bipolar transistor 50. A dotted line k16 shows relation between collector voltage VCE and collector current IC at the time of start of the precharge processing. A dotted line k17 shows, as comparison, relation between collector voltage VCE and collector current IC when the limiting resistor (resistance value R) for inrush current prevention is connected in series to the bipolar transistor.

As shown in FIG. 6, the voltage-current characteristic the same as in the case of power MOSFET 40 shown in FIG. 3 is also exhibited in bipolar transistor 50. Therefore, by setting base voltage VBE of bipolar transistor 50 to VBE3 such that collector current IC at the time of start of the precharge processing is set to a value corresponding to a point P13, power loss of bipolar transistor 50 can be suppressed to a value not higher than the maximum rated power shown with dotted line k15, and bipolar transistor 50 can be prevented from breaking.

In addition, by setting base voltage VBE of bipolar transistor 50 to VBE3, bipolar transistor 50 operates in the active region. Therefore, in the variation of the first embodiment as well, the bipolar transistor of a small capacity can be selected, and a smaller size and lower cost of the device can be achieved.

As described above, an effect the same as in the first embodiment can be obtained also according to the variation of the first embodiment.

Second Embodiment

Figure 7:
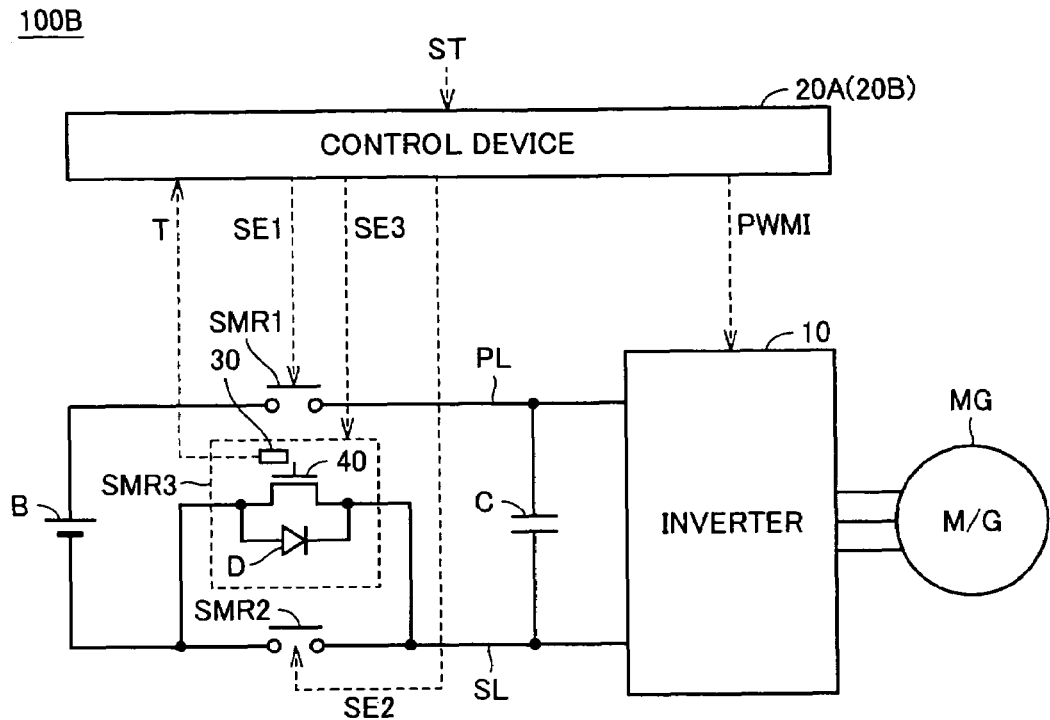
FIG. 7 is an overall block diagram of a load drive device including a power supply control device according to the second embodiment of the present invention.

FIG. 7 is an overall block diagram of a load drive device including a power supply control device according to the second embodiment of the present invention. Referring to FIG. 7, a load drive device 100B further includes a temperature sensor 30 and includes a control device 20A instead of control device 20 in the configuration of load drive device 100 in the first embodiment shown in FIG. 1.

Temperature sensor 30 is arranged in the vicinity of power MOSFET 40 of system main relay SMR3, detects a temperature T of power MOSFET 40, and outputs the temperature to control device 20. For example, temperature sensor 30 may be implemented by a sensor that detects a temperature of power MOSFET 40 using a thermistor, or by a sensor that detects a temperature by utilizing temperature dependency of the voltage across terminals of the diode arranged in the proximity of power MOSFET 40.

Control device 20A performs the precharge processing upon receiving start signal ST, as in the case of control device 20 in the first embodiment. Here, when the precharge processing is started, control device 20A sets gate voltage VGS of power MOSFET 40 of system main relay SMR3 to the maximum voltage. As temperature T of power MOSFET 40 detected by temperature sensor 30 is raised, however, control device 20A lowers gate voltage VGS with the increase in the temperature. Thus, drain current ID of power MOSFET 40 is suppressed, and temperature increase in power MOSFET 40 is suppressed. Gate voltage VGS of power MOSFET 40 is supplied to power MOSFET 40 as signal SE3, as in the first embodiment.

Figure 8:
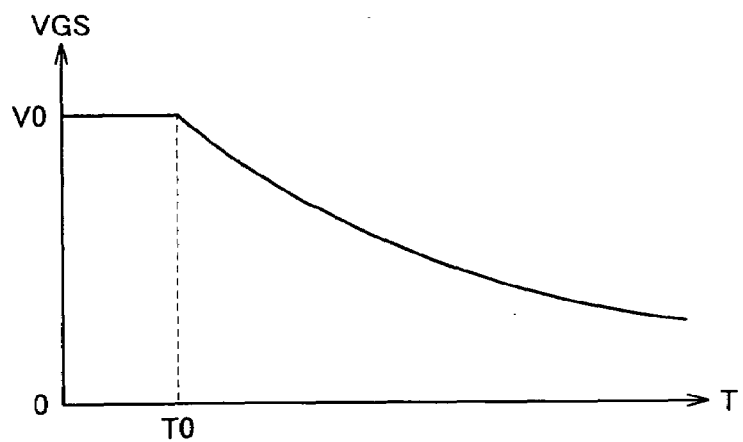
FIG. 8 shows a gate voltage of a power MOSFET controlled by the control device shown in FIG. 7.

FIG. 8 illustrates a gate voltage of power MOSFET 40 controlled by control device 20A shown in FIG. 7. Referring to FIG. 8, when temperature T of power MOSFET 40 exceeds a temperature T0 indicating the temperature increase thereof, control device 20A lowers gate voltage VGS of power MOSFET 40 from a maximum voltage V0 with the increase in temperature T. Here, maximum voltage V0 is comparable to gate voltage VGS2 corresponding to point P2, in the characteristic diagram of power MOSFET 40 shown in FIG. 3.

Figure 9:
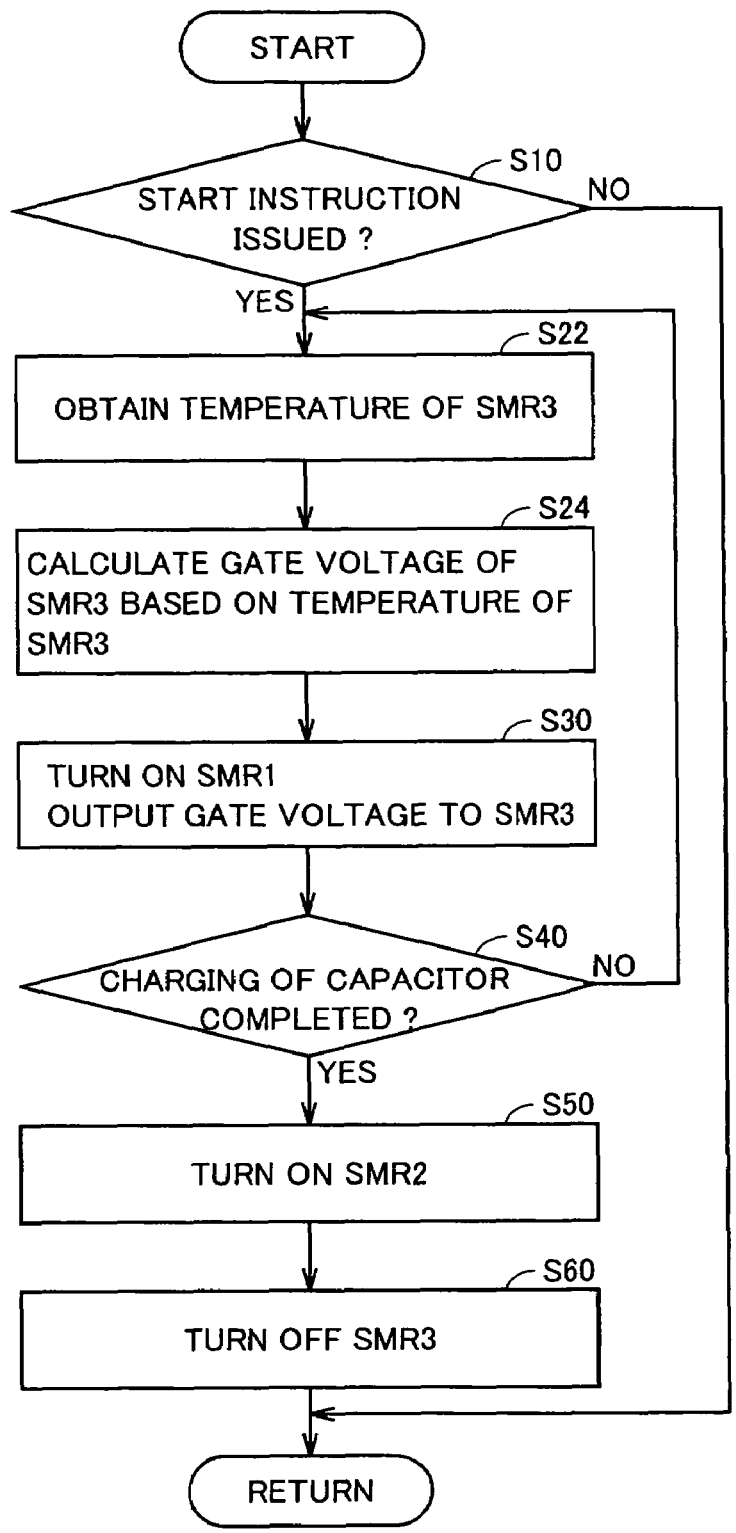
FIG. 9 is a flowchart of precharge processing performed by the control device shown in FIG. 7

FIG. 9 is a flowchart of the precharge processing performed by control device 20A shown in FIG. 7. Referring to FIG. 9, the processing configuration shown in the flowchart includes steps S22, S24 instead of step S20 in the processing configuration shown in FIG. 4. Namely, if it is determined in step S10 that the instruction to start load drive device 100B has been issued (YES in step S10), control device 20A obtains temperature T of power MOSFET 40 of system main relay SMR3 detected by temperature sensor 30 from temperature sensor 30 (step S22).

Then, control device 20A calculates gate voltage VGS of power MOSFET 40 of system main relay SMR3 based on temperature T of power MOSFET 40 obtained from temperature sensor 30 (step S24). Specifically, for example, relation between temperature T of power MOSFET 40 and gate voltage VGS shown in FIG. 8 is defined in a map in advance, and control device 20A uses the map to calculate gate voltage VGS based on temperature T from temperature sensor 30. Then, control device 20A proceeds to step S30.

During the precharge processing, control device 20A successively calculates gate voltage VGS based on temperature T from temperature sensor 30. Namely, if it is determined in step S40 that charging of capacitor C is not completed (NO in step S40), control device 20A returns to step S22.

In the description above, power MOSFET 40 is used as the semiconductor transistor for precharge, however, bipolar transistor 50 may be used instead of power MOSFET 40 as in the variation of the first embodiment.

As described above, according to the second embodiment, the limiting resistor for preventing the inrush current is not included, and the gate voltage of power MOSFET 40 is controlled such that an amount of current that flows in power MOSFET 40 is decreased when the temperature of power MOSFET 40 used as the relay for precharge is raised. Therefore, overheat of power MOSFET 40 can reliably be prevented.

Third Embodiment

In the second embodiment, when the temperature of power MOSFET 40 of system main relay SMR3 is raised, gate voltage VGS of power MOSFET 40 is lowered with the increase in the temperature thereof In the third embodiment, when the temperature of power MOSFET 40 is raised, power MOSFET 40 is turned on/off, and on-duty of power MOSFET 40 is lowered with the temperature increase in power MOSFET 40.

The entire configuration of the load drive device in the third embodiment is the same as that of load drive device 100B in the second embodiment shown in FIG. 7.

Figure 10:
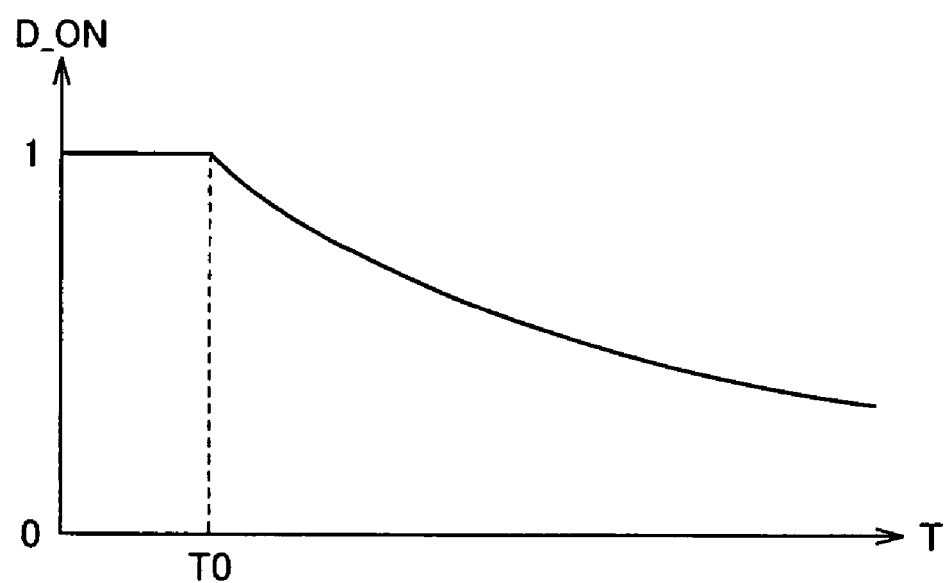
FIG. 10 shows on-duty of a power MOSFET controlled by a control device in the third embodiment.

FIG. 10 illustrates on-duty D_ON of power MOSFET 40 controlled by control device 20B in the third embodiment. Referring to FIG. 10, when temperature T of power MOSFET 40 exceeds temperature T0 indicating temperature increase thereof, control device 20B subjects power MOSFET 40 to switching control such that an average amount of current that flows in power MOSFET 40 is decreased. Here, control device 20B lowers on-duty D_ON of power MOSFET 40 with the temperature increase in power MOSFET 40.

Figure 11:
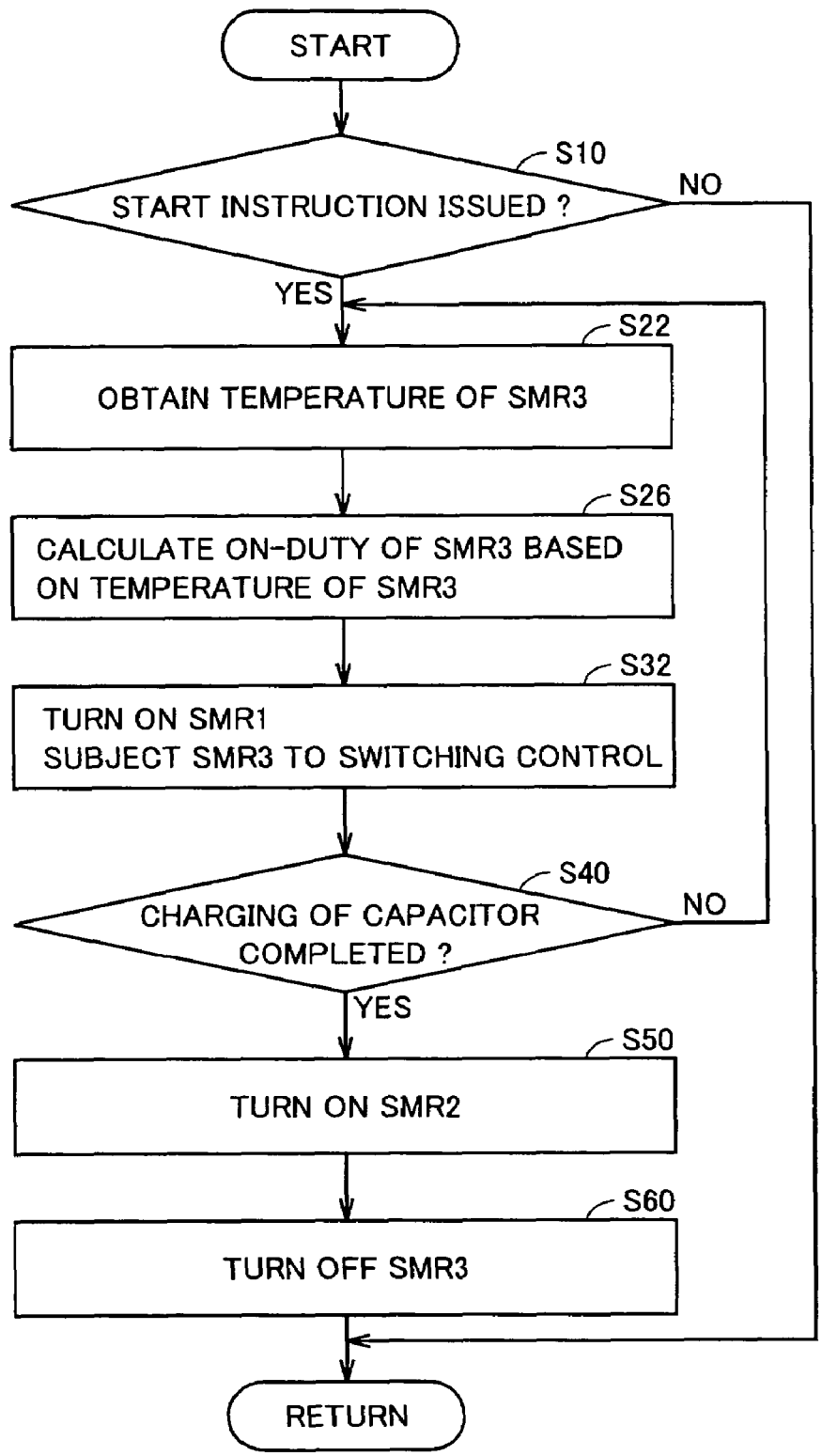
FIG. 11 is a flowchart of precharge processing performed by the control device in the third embodiment.
Figure 12:
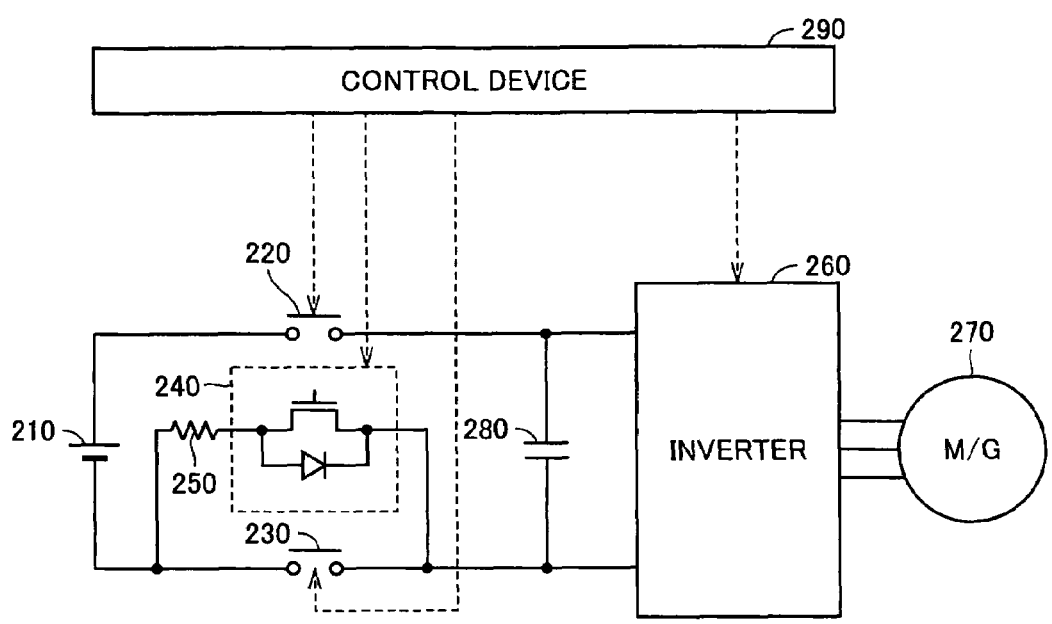
FIG. 12 is an overall block diagram of a load drive device including a conventional power supply control device.

FIG. 11 is a flowchart of the precharge processing performed by control device 20B in the third embodiment. Referring to FIG. 11, the processing configuration shown in the flowchart includes steps S26, S32 instead of steps S24, S30 respectively in the processing configuration shown in FIG. 9. Namely, when temperature T of power MOSFET 40 of system main relay SMR3 is obtained from temperature sensor 30 in step S22, control device 20B calculates on-duty D_ON of power MOSFET 40 of system main relay SMR3 based on the temperature of power MOSFET 40 obtained from temperature sensor 30 (step S26). Specifically, for example, relation between temperature T of power MOSFET 40 and on-duty D_ON shown in FIG. 10 is defined in a map in advance, and control device 20B uses the map to calculate on-duty D_ON based on temperature T from temperature sensor 30.

When on-duty D_ON of power MOSFET 40 is calculated, control device 20B subjects power MOSFET 40 to switching control at calculated on-duty D_ON, and turns on system main relay SMR1 (step S32). Then, control device 20B proceeds to step S40.

During the precharge processing, control device 20B successively calculates on-duty D_ON of power MOSFET 40 based on temperature T from temperature sensor 30. Namely, if it is determined in step S40 that charging of capacitor C is not completed (NO in step S40), control device 20B returns to step S22.

In the description above as well, power MOSFET 40 is used as the semiconductor transistor for precharge, however, bipolar transistor 50 may be used instead of power MOSFET 40 as in the variation of the first embodiment.

As described above, according to the third embodiment, the limiting resistor for preventing the inrush current is not included, and power MOSFET 40 is subjected to switching control such that an average amount of current that flows in power MOSFET 40 is decreased when the temperature of power MOSFET 40 used as the relay for precharge is raised. Therefore, overheat of power MOSFET 40 can reliably be prevented.

In each embodiment above, system main relay SMR3 for precharge processing is assumed to be connected in parallel to system main relay SMR2 connected to the negative electrode of DC power supply B, however, it may be connected in parallel to system main relay SMR1 connected to the positive electrode of DC power supply B.

In the description above, system main relay SMR1 or SMR2 corresponds to the "relay" in the present invention, and power MOSFET 40 of system main relay SMR3 or bipolar transistor 50 of system main relay SMR3A corresponds to the "semiconductor switching element" in the present invention. In addition, capacitor C, inverter 10 and motor-generator MG form the "load device" in the present invention, and control devices 20, 20A and 20B correspond to the "control unit" in the present invention. Moreover, DC power supply B, system main relays SMR1 to SMR3 (or SMR3A) and control device 20 (or 20A, 20B) form the "power supply control device" in the present invention. Further, temperature sensor 30 corresponds to the "temperature detection unit" in the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply control device comprising:
   a DC power supply;
   a relay provided between one electrode of said DC power supply and a load device;
   a semiconductor switching element connected in parallel to said relay; and
   a control unit performing precharge processing for supplying electric charges from said DC power supply to said load device through said semiconductor switching element before turn-on of said relay; and
   said control unit being configured to control one of:
      a gate voltage of said semiconductor switching element to be a first voltage threshold, so that a drain current of said semiconductor switching element at a time of start of said precharge processing is set to a value corresponding to a first drain current threshold such that power loss of said semiconductor switching element does not exceed maximum rated power of said semiconductor switching element, and
      a base voltage of said semiconductor switching element such that a first collector current value at a time of start of said precharge processing is a value corresponding to a first collector threshold such that rower loss of said semiconductor switching element does not exceed maximum rated power of said semiconductor switching element.

2. The power supply control device according to claim 1, wherein
   said semiconductor switching element is implemented by a field-effect transistor, and
   said control unit controls a gate voltage of said field-effect transistor such that said field-effect transistor operates in a saturation region.

3. The power supply control device according to claim 1, wherein
   said semiconductor switching element is implemented by a bipolar transistor such that said bipolar transistor operates in an active region.

4. A precharge processing method of performing precharge from a power supply device to a load device, said power supply device including a DC power supply, a relay provided between one electrode of said DC power supply and said load device, and a semiconductor switching element connected in parallel to said relay, comprising:
   a first step of calculating one of:
      a gate voltage of said semiconductor switching element to be a first voltage threshold, such that a drain current of said semiconductor switching element at a time of start of said precharge processing is a value corresponding to a first drain current threshold such that power loss of said semiconductor switching element does not exceed maximum rated power of said semiconductor switching element, and
      a base voltage of said semiconductor switching element such that a first collector current value at a time of start of said precharge processing is a value corresponding to a first collector threshold such that power loss of said semiconductor switching element does not exceed maximum rated power of said semiconductor switching element;
   a second step of outputting one of the calculated gate voltage and calculated base voltage to a control electrode of said semiconductor switching element;
   a third step of determining whether said precharge performed through said semiconductor switching element is completed; and
   a fourth step of turning on said relay when it is determined that said precharge is completed.

5. The precharge processing method according to claim 4, wherein
   said semiconductor switching element is implemented by a field-effect transistor, and
   in said first step, a gate voltage of said field-effect transistor is calculated such that said field-effect transistor operates in a saturation region.

6. The precharge processing method according to claim 4, wherein
   said semiconductor switching element is implemented by a bipolar transistor such that said bipolar transistor operates in an active region.

* * * * *